J. GETZ.
Smut Mill.

No. 92,038.

Patented June 29, 1869.

Witnesses.
N. J. Chamberlain
J. B. Duke

Inventor.
Jacob Getz, assignor
J. Fraser & Co. Atty

United States Patent Office.

JACOB GETZ, OF BUFFALO, NEW YORK, ASSIGNOR TO HIMSELF AND SAMUEL WILSON, OF SAME PLACE.

Letters Patent No. 92,038, dated June 29, 1869.

---

IMPROVEMENT IN SMUT-MACHINES.

---

The Schedule referred to in these Letters Patent and making part of the same.

---

*To all whom it may concern:*

Be it known that I, JACOB GETZ, of Buffalo, in the county of Erie, and State of New York, have invented certain new and useful Improvements in Smut-Machines; and I do hereby declare that the following is a full and exact description thereof, reference being had to the accompanying drawings, making part of this specification, in which—

Like letters of reference indicate corresponding parts in all the figures.

Figure 1:
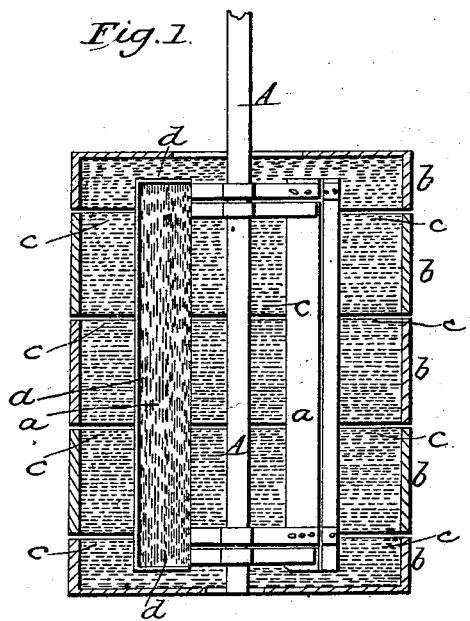
Figure 1 is a sectional elevation of the concave of a smut-machine, showing the beaters therein, both having my improvement attached.

My invention consists in forming a smut-machine of sectional concaves, having raised edges, and of beaters, also having such edges, and provided with emery-filling, whereby is formed a simple and practical machine, as will be hereinafter described.

In the drawings—

A, fig. 1, represents the shaft, to which the beaters $a\ a$ are attached, and which revolves the same.

$b\ b\ b\ b$ represent the concaves, made in separate sections, as is usual, but having the additional feature of raised edges or rims $c\ c$, formed all around each, which serve to hold the composition which will be poured or otherwise placed in each.

This composition will present a surface of emery, which will be firmly held by said composition, or form an important part of it, either by being moulded with it, or set in, or otherwise retained in the most suitable and desirable manner that will present a scouring-surface, for the purpose of cleaning wheat or other grain.

Figure 2:
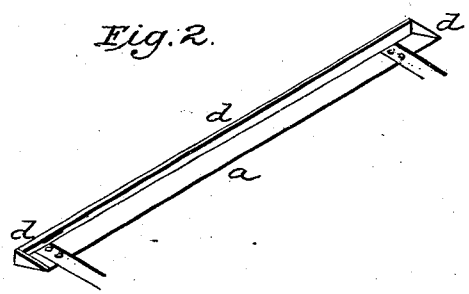
Figure 2 is a perspective view of one of the beaters.
Figure 3:
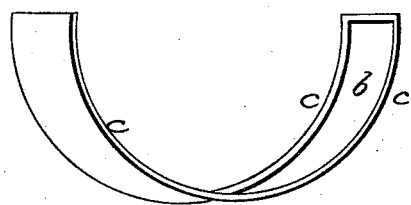
Figure 3 shows one-half of one of the concaves with the raised edges.

The beaters $a\ a$ have also a raised edge, $d\ d$, which rises in height from the inner to the outer edges, as clearly shown in fig. 2, in order to hold a similar composition, having emery on its entire surface, the same as in the concaves, and for the same purpose, the two producing a joint action.

The raised edge $d$ of the beaters slants down at the sides to the inner edge, in order that the body of the emery shall rest near to the outer edge of each of the beaters, where it is most wanted, as it comes in contact, during its revolutions, with the wheat or grains between it and the concaves, the two equally combining to thoroughly clean the grains.

The beaters and concaves of ordinary smut-machines are, as is well known, made with corrugated plates, or with metal rubbing or cutting-surfaces, which wear smooth and are soon destroyed, necessitating the expense of new beaters and concaves. They also perform the work imperfectly, and break the wheat, which mine will not.

I intend to employ or use coarse or fine emery, whichever I find will answer the purpose best. I shall probably use three or more grades in the concaves, so that the wheat, before it goes out at the exit place, will be more perfectly scoured.

Another advantage in using the emery is, that as soon as it wears smooth on either beaters or concaves, another beater or concave section, having fresh emery on it, can be at once put in, and there will be no wear and tear of either, only so far as the emery is concerned, which can be easily and cheaply replaced, and it can be quickly applied to either beaters or concaves as fast as worn down.

The special advantage of forming a kind of receptacle in the beaters and concaves, by raising the edges, is to hold a larger body of the composition which holds the emery than could be otherwise retained on a flat surface.

As before stated, the composition for holding the emery on to the beaters and concaves may be of any suitable properties that will best accomplish the result, or the emery may be mixed with gutta-percha, vulcanized rubber, or similar holding-substances.

If found useful, I propose also to make the section of the concaves, and also the beaters of such machines, mainly of vulcanized rubber and emery, which will be employed instead of the metal ones now in use.

What I claim as my invention, and desire to secure by Letters Patent, is—

A smut-machine, consisting of the sectional concaves $b\ b$, with raised edges $c$, and beaters $a$, with edges $d$ combined, and provided with the emery filling, substantially as and for the purpose described.

In witness whereof, I have hereunto signed my name, in the presence of two subscribing witnesses.

JACOB GETZ.

Witnesses:
J. R. DRAKE,
ALBERT HAIGHT.